United States Patent
Åkerberg et al.

(10) Patent No.: US 8,704,406 B2
(45) Date of Patent: Apr. 22, 2014

(54) SOLAR POWER PLANT

(75) Inventors: Jussi Åkerberg, Espoo (FI); Kari Kovanen, Espoo (FI); Peter Lindgren, Espoo (FI)

(73) Assignee: ABB Oy, Helsinki (FI)

( * ) Notice: Subject to any disclaimer, the term of this patent is extended or adjusted under 35 U.S.C. 154(b) by 1137 days.

(21) Appl. No.: 12/686,051

(22) Filed: Jan. 12, 2010

(65) Prior Publication Data

US 2010/0180926 A1 Jul. 22, 2010

(30) Foreign Application Priority Data

Jan. 12, 2009 (FI) .................................... 20095018

(51) Int. Cl.
- *H02J 1/00* (2006.01)
- *H01J 3/00* (2006.01)
- *H02J 3/00* (2006.01)

(52) U.S. Cl.
CPC ....................................... *H02J 3/00* (2013.01)
USPC ............................................. 307/82; 363/95

(58) Field of Classification Search
USPC ................................. 307/43, 51, 87
See application file for complete search history.

(56) References Cited

U.S. PATENT DOCUMENTS

| | | | |
|---|---|---|---|
| 2005/0105306 A1* | 5/2005 | Deng et al. | 363/37 |
| 2007/0029881 A1* | 2/2007 | Lai | 307/82 |
| 2009/0121549 A1* | 5/2009 | Leonard | 307/51 |
| 2009/0283129 A1* | 11/2009 | Foss | 136/244 |
| 2010/0091529 A1* | 4/2010 | Jakeman et al. | 363/36 |

FOREIGN PATENT DOCUMENTS

| | | |
|---|---|---|
| JP | 3568023 B2 | 9/2004 |
| JP | 2006-014556 A | 1/2006 |
| JP | 2008-198829 A | 8/2008 |
| WO | WO 97/22174 A1 | 6/1997 |

OTHER PUBLICATIONS

An English Translation of the Office Action (Notification of the Second Office Action) dated Aug. 14, 2012, issued in corresponding Chinese Patent Application No. 201010002348.6. (10 pages).

(Continued)

*Primary Examiner* — Stephen W Jackson
*Assistant Examiner* — Toan Vu
(74) *Attorney, Agent, or Firm* — Buchanan Ingersoll & Rooney PC

(57) ABSTRACT

A solar power plant is disclosed for converting solar energy into electric energy, and having a plurality of solar cell units, each solar cell unit containing a first cell pole and a second cell pole. The cell poles can cooperate for feeding electric energy produced by the solar cell unit as direct current out of the solar cell unit. A direct-current converter can include a plurality of direct-current input poles and two direct-current output poles, each direct-current input pole being connected to at least one cell pole. The direct-current converter can convert input direct currents entered via the direct-current input poles, and having input voltages, into an output direct current having an output voltage, and feed the output direct current via the direct-current output poles out of the direct-current converter. The direct-current converter can include a three-phase inverter unit having three phase poles and two direct-voltage poles, the inverter unit being adapted to serve as a direct-current converter in such a manner that each of the three phase poles are adapted as direct-current input poles and each of the direct-voltage poles is in electrically conductive connection to exactly one direct-current output pole of the direct-current converter.

9 Claims, 1 Drawing Sheet

(56) References Cited

OTHER PUBLICATIONS

Finnish Search Report of Application No. 20095018 dated Oct. 21, 2009 (with English language translation of category of cited documents).

An English Translation of the Office Action (Notification of the First Office Action) dated Feb. 29, 2012, issued by the Chinese Patent Office in corresponding Chinese Patent Application No. 201010002348.6. (8 pp.).

Chinese Office Action issued Aug. 30, 2013 by the Chinese Patent Office in corresponding Chinese Patent Application No. 201010002348.6; and English translation thereof.

Rik W. A. A. De Doncker, Deepakraj M. Divan and Mustansir H. Kheraluwala, A Three-Phase Soft-Switched High-Power-Density dc/dc Converter for High-Power Applications, IEEE Transactions on Industry Applications, vol. 27, No. 1, Jan./Feb. 1991, pp. 63-73.

* cited by examiner

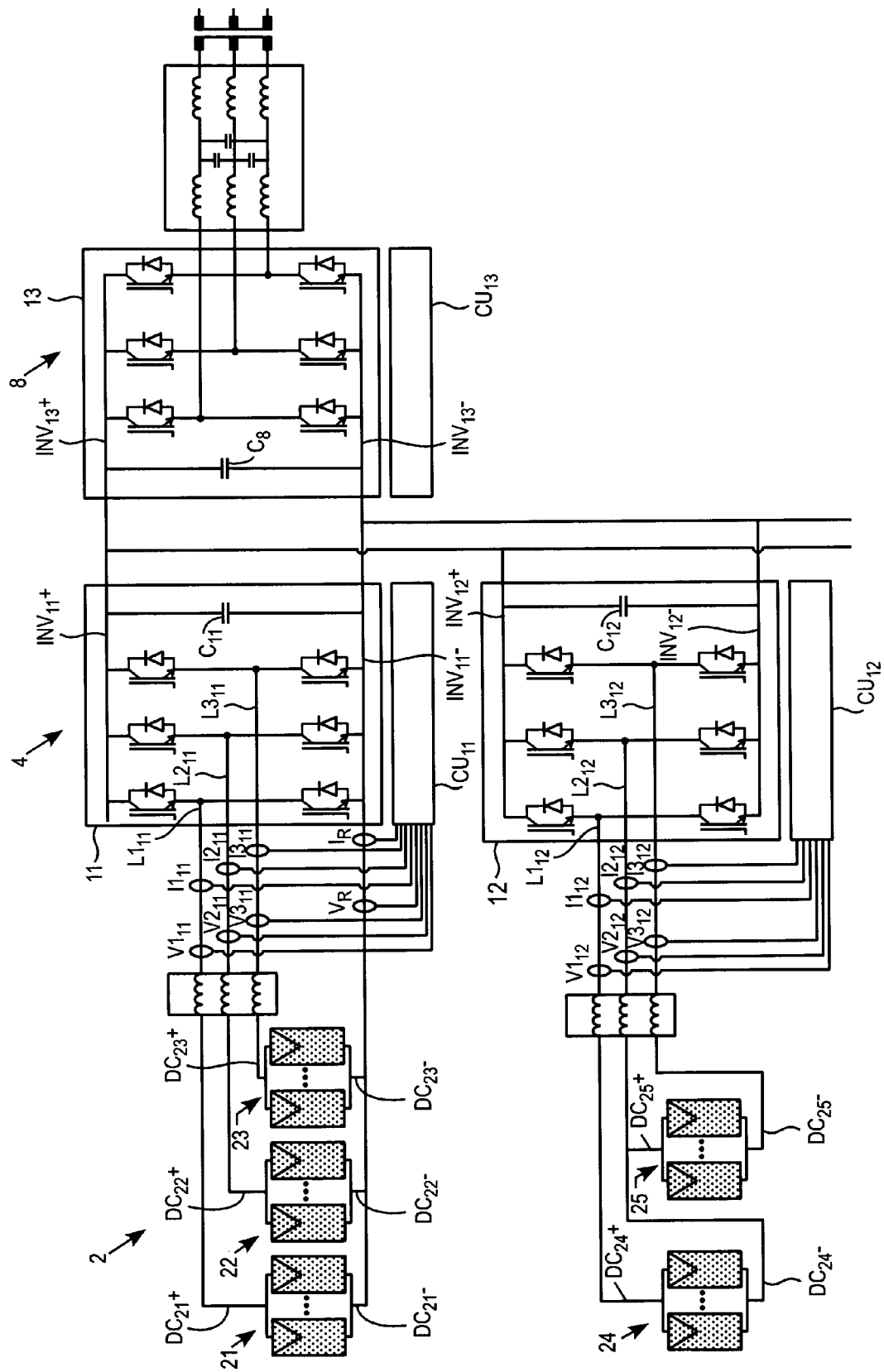

SOLAR POWER PLANT

RELATED APPLICATIONS

This application claims priority under 35 U.S.C. §119 to Finnish Patent Application No. 20095018 filed in Finland on Jan. 12, 2009, the entire content of which is hereby incorporated by reference in its entirety.

FIELD

The disclosure relates to a solar power plant.

BACKGROUND INFORMATION

It is known to convert solar radiation at a frequency of visible light into electric energy using solar cells. Each solar cell can generate direct current, the magnitude of which varies as a function of the solar radiation hitting the solar cell in question. A solar power plant can include a plurality of solar cells with a direct-current converter adapted to convert input direct currents obtained from the solar cells, and having input voltages, into an output direct current having an output voltage. It is known to implement the direct-current converter using single-phase dc/dc choppers.

Known direct-current converters of solar power plants implemented by single-phase dc/dc choppers can be expensive, consume a great deal of space, and be unreliable.

SUMMARY

A solar power plant is disclosed, comprising: solar cell means for converting solar energy into electric energy and having a plurality of solar cell units, each solar cell unit containing a first cell pole and a second cell pole which cooperate for feeding electric energy produced by the solar cell units as direct current from the solar cell units; and direct-current converter means having a plurality of direct-current input poles and two direct-current output poles, each direct-current input pole being connected to at least one cell pole, the direct-current converter means being configured for converting input direct currents entered via the direct-current input poles into an output direct current having an output voltage, and for feeding the output direct current via the direct-current output poles from the direct-current converter means, wherein the direct-current converter means includes a three-phase inverter unit having three phase poles and two direct-voltage poles for serving as a direct-current converter such that each of the three phase poles is one of the direct-current input poles and each of the direct-voltage poles is in electrically conductive connection with exactly one of the direct-current output poles.

A method for inverting solar energy into an electrical direct current is also disclosed, the method comprising: converting solar energy into electric energy via a plurality of solar cell units, each solar cell unit containing a first cell pole and a second cell pole which cooperate for feeding electric energy produced by the solar cell unit as direct current from the solar cell unit; converting the direct currents received from the solar cell units into an output direct current having an output voltage; and feeding the output direct current via direct-current output poles of a direct-current converter, wherein the direct-current converter includes a three-phase inverter unit having three phase poles and two direct-voltage poles for serving as the direct-current converter such that each of the three phase poles is one of the direct-current input poles, and each of the direct-voltage poles is in electrically conductive connection with exactly one of the direct-current output poles.

BRIEF DESCRIPTION OF THE DRAWINGS

The disclosure will now be explained in greater detail in connection with exemplary preferred embodiments, with reference to the drawings, wherein:

FIG. 1 shows a simplified connection diagram of an exemplary solar power plant according to an embodiment of the disclosure.

DETAILED DESCRIPTION

A solar power plant is disclosed which includes a three-phase inverter unit as a direct-current converter in the direct-current converter means of the solar power plant.

An exemplary solar power plant according to the disclosure can include lower costs, smaller space requirements and higher reliability of a direct current converter means. Lower costs can be achieved because, for instance, three-phase inverters are manufactured in large series compared with production series of single-phase dc/dc choppers. Less space can be consumed because in three-phase inverter units, six switches can be integrated into one unit. The reliability of three-phase inverters can be higher than that of single-phase dc/dc choppers because there can be significantly more three-phase inverter units than single-phase dc/dc choppers in use, so that there is more experience in using three-phase inverter units.

The exemplary solar power plant of FIG. 1 includes solar cell means represented as one or more solar cells 2 configured (e.g., adapted) to convert solar energy into direct current; direct-current converter means represented as a converter 4 configured (e.g., adapted) to convert input direct currents produced by the solar cell means 2 into an output direct current; energy storing means represented as storage capacitors C configured (e.g., adapted) to store electric energy; and network inverter means represented as an inverter 8 configured (e.g., adapted) to invert the electricity fed by the direct-current converter means 4 and to feed it to a distribution network.

The exemplary solar cell means 2 includes a plurality of solar cell units 21 to 25, each of which includes a first cell pole and a second cell pole which are adapted to cooperate for feeding electric energy produced by the solar cell unit as direct current out of the solar cell unit. In FIG. 1, the first cell pole of each solar cell unit 21 to 25 is a positive pole while the second cell pole is a negative pole, such that in an operating situation the electric potential of the first cell pole can be higher than that of the second cell pole.

The exemplary direct-current converter means 4 includes six direct-current input poles, each of which is connected to at least one cell pole, and two direct-current output poles. The direct-current converter means 4 are adapted to convert input direct currents entered via the direct-current input poles and having input voltages into an output direct current having an output voltage, and to feed the output direct current via the direct-current output poles out of the direct-current converter means 4.

The direct-current converter means 4 can be implemented with two three-phase inverter units 11 and 12, each having three phase poles and two direct-voltage poles. The three phase poles of the inverter unit 11 are denoted by $L1_{11}$, $L2_{11}$ and $L3_{11}$, the direct-voltage poles being denoted by $INV_{11}+$ and $INV_{12}-$. The three phase poles of the inverter unit 12, in turn, are denoted by $L1_{12}$, $L2_{12}$ and $L3_{12}$, the direct-voltage poles being denoted by $INV_{12}+$ and $INV_{12}-$. Each inverter unit can be adapted to serve as a direct-current converter in such a way that each of its three phase poles is adapted as a direct-current input pole for the direct-current converter means, and each of its direct-voltage poles is in electrically conductive connection to one direct-current output pole of the direct-current converter means 4. Thus, the exemplary direct-current converter means 4 can have exactly one positive direct-current output pole and exactly one negative direct-current output pole.

In an alternative exemplary embodiment of the disclosure, the direct-current converter means can include only one inverter unit. In this case, the direct-voltage poles of the inverter unit can be adapted as direct-current output poles of the direct-current converter means. In other words, the direct-voltage poles of an inverter unit component can serve as direct-current output poles of the direct-current converter means without any additional components or connections. As regards the connections of the direct-current input poles of the direct-current converter means, those skilled in the art will appreciate that the scope of the disclosure encompasses all solutions in which direct current generated by the solar cell means is introduced into the inverter unit via the phase poles, irrespective of whether the direct current introduced passes via some additional components or not.

Each phase pole of the inverter unit 11 can, for example, be connected to exactly one cell pole in such a way that the phase pole $L1_{11}$ is connected to a first cell pole $DC_{21}+$ of the solar cell unit 21, the phase pole $L2_{11}$ is connected to a first cell pole $DC_{22}+$ of the solar cell unit 22, and the phase pole $L3_{11}$ is connected to a first cell pole $DC_{23}+$ of the solar cell unit 23. Of the three phase poles of the inverter unit 12, the first phase pole $L1_{12}$ is connected to a first cell pole $DC_{24}+$ of the solar cell unit 24, the second phase pole $L2_{12}$ is connected to both a second cell pole $DC_{24}-$ of the solar cell unit 24 and a first cell pole $DC_{25}+$ of the solar cell unit 25, and the third phase pole $L3_{12}$ is connected to a second cell pole $DC_{25}-$ of the solar cell unit 25.

The inverter units 11 and 12 can be connected in parallel in such a way that both the positive direct-voltage pole $INV_{11}+$ of the inverter unit 11 and the positive direct-voltage pole $INV_{12}+$ of the inverter unit 12 are in electrically conductive connection to the positive direct-current output pole of the direct-current converter means 4. Correspondingly, both the negative direct-voltage pole $INV_{11}-$ of the inverter unit 11 and the negative direct-voltage pole $INV_{12}-$ of the inverter unit 12 can be in electrically conductive connection to the negative direct-current output pole of the direct-current converter means 4.

In the exemplary direct-current converter means of an exemplary solar power plant according to the disclosure, the inverter unit can be adapted to serve in a manner deviating from the usual. The inverter unit can be adapted to invert direct current in such a way that the direct current introduced to the direct-voltage poles of the inverter unit is converted, in the inverter unit, into alternating current which is fed out via the phase poles of the inverter unit. In this text, the poles of the inverter unit are named on the basis of a normal operation of the inverter unit, i.e. inversion. For this reason, the poles of each inverter unit of the direct-current converter means, adapted to receive direct current from the solar cell means, are called phase poles.

An exemplary energy storing means are connected to the direct-current output poles of the direct-current converter means 4 and adapted to store electric energy. The energy storing means comprise a capacitor $C_{11}$ connected between the direct-voltage poles $INV_{11}+$ and $INV_{11}-$ of the inverter unit 11, a capacitor $C_{12}$ connected between the direct-voltage poles $INV_{12}+$ and $INV_{12}-$ of the inverter unit 12, and a capacitor $C_8$ connected between the direct-voltage poles of the network inverter means 8. The energy storing means are adapted to even out time variation in the electricity generation of the solar cell means 2.

Exemplary network inverter means 8 can include a three-phase inverter unit 13 whose positive direct-voltage pole $INV_{13}+$ is in electrically conductive connection to the positive direct-voltage poles $INV_{11}+$ and $INV_{12}+$ of the inverter units 11 and 12. The negative direct-voltage pole $INV_{13}-$ of the inverter unit 13 is in electrically conductive connection to the negative direct-voltage poles $INV_{11}-$ and $INV_{12}-$ of the inverter units 11 and 12.

The three-phase inverter unit 13 of the network inverter means 8 can be identical to the inverter units 11 and 12 of the direct-current converter means 4. In an exemplary embodiment of the disclosure, all three-phase inverter units used in direct-current converter means and network inverter means are identical. Advantages of such an arrangement include, for example, facilitation of maintenance thanks to the reduced number of spare parts.

Each of the inverter units 11, 12 and 13 can include six controllable switches connected in bridge connection in a manner that is completely known in the field. The bridge connection can include a positive busbar and a negative busbar. The positive busbar is, in an exemplary operating situation, substantially at the same potential as the positive direct-voltage pole of the inverter unit, and the negative busbar is, in an operating situation, substantially at the same potential as the negative direct-voltage pole of the inverter unit. It is seen from the exemplary FIG. 1 embodiment that the positive busbar of each inverter unit is connected to three controllable switches in the upper row and that the negative busbar is connected to three controllable switches in the lower row. It is further seen from FIG. 1 that the second cell poles $DC_{21}-$, $DC_{22}-$ and $DC_{23}-$ of the solar cell units 21, 22 and 23, i.e. the negative cell poles, are in electrically conductive connection to the negative busbar of the inverter unit 11 in such a way that the second cell poles of the solar cell units 21, 22 and 23 are, in an operating situation, substantially at the same potential as the negative busbar of the inverter unit 11.

The controllable switches of each inverter unit can be controlled with the control unit of the inverter unit in question. A control unit $CU_{11}$ is adapted to control the controllable switches of the inverter unit 11, a control unit $CU_{12}$ is adapted to control the controllable switches of the inverter unit 12, and a control unit $CU_{13}$ is adapted to control the controllable switches of the inverter unit 13.

The control unit $CU_{11}$ can be adapted to measure the magnitude and voltage of the current entering each phase pole of the inverter unit 11. In other words, the control unit $CU_{11}$ measures magnitude $I1_{11}$ and voltage $U1_{11}$ of the current entering the phase pole $L1_{11}$, magnitude $I2_{11}$ and voltage $U2_{11}$ of the current entering the phase pole $L2_{11}$, and magnitude $I3_{11}$ and voltage $U3_{11}$ of the current entering the phase pole $L3_{11}$. Further, the control unit $CU_{11}$ is adapted to measure current $I_R$ between the negative busbar of the inverter unit 11 and the second cell poles of the solar cell units 21, 22 and 23, and voltage $U_R$ of the negative busbar of the inverter unit 11.

The control unit $CU_{12}$ can be adapted to measure the voltage and current of each phase pole of the inverter unit 12. The variables to be measured are voltage $U1_{12}$ and current $I1_{12}$ of the phase pole $L1_{12}$, voltage $U2_{12}$ and current $I2_{12}$ of the phase pole $L2_{12}$, and voltage $U3_{12}$ and current $I3_{12}$ of the phase pole $L3_{12}$.

Each of the solar cell units 21 to 25 can include a plurality of solar cell strings connected in parallel, each solar cell string having, for example, a plurality of solar cell elements connected in series. In an alternative embodiment of the disclosure, the solar cell means can include at least one solar cell unit having only one solar cell string. In another alternative embodiment of the disclosure, the solar cell means include at least one solar cell unit, all solar cell elements of which are connected in parallel with each other. Further, in yet another alternative exemplary embodiment of the disclosure, the solar cell means can include at least one solar cell unit having exactly one solar cell element. Various combinations of the above embodiments are also feasible.

In an exemplary solar power plant according to the disclosure, the power of each solar cell unit can be individually optimized by utilizing the measurement information of the corresponding control unit and by controlling the controllable switches of the direct-current converter means on the basis of this measurement information. Utilizing direct-current-input-pole-specific measurement information also can enable solar-cell-unit-specific monitoring and protection.

Solar cell units with electric properties deviating from each other, for instance with regard to nominal power or nominal voltage, can be connected to the inverter unit of the direct-current converter means of the solar power plant according to an exemplary embodiment of the disclosure. For instance in a case where the voltage generated by a solar cell unit connected to one direct-current input pole of the direct-current converter means is lower than the voltage of the other direct-current input poles, the controllable switches connected to the direct-current input pole with the lower voltage is controlled in such a way that they can raise the voltage to substantially the same level as at the other direct-current input poles.

It will be apparent to a person skilled in the art that the basic idea of the disclosure may be implemented in a plurality of ways. The disclosure and its embodiments are not restricted to the examples described but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A solar power plant comprising:
   solar cell means for converting solar energy into electric energy and having a plurality of solar cell units, each solar cell unit containing a first cell pole and a second cell pole which cooperate for feeding electric energy produced by the solar cell units as direct current from the solar cell units, the first cell pole of a first one of the plurality of solar cell unit having a same polarity as a first cell pole of a second one of the plurality of cell units; and
   direct-current converter means having a plurality of direct-current input poles and two direct-current output poles, each direct-current input pole being connected to at least one of the cell poles, the direct-current converter means being configured for converting input direct currents entered via the direct-current input poles into an output direct current having an output voltage, and for feeding the output direct current via the direct-current output poles from the direct-current converter means,
   wherein the direct-current converter means includes a three-phase inverter unit having three phase poles and two direct-voltage poles for serving as a direct-current converter such that each of the three phase poles is one of the direct-current input poles and each of the direct-voltage poles is in electrically conductive connection with exactly one of the direct-current output poles, and
   wherein a first phase pole of the three phase poles of the inverter unit of the direct-current converter means is connected to a first cell pole of one of the solar cell units, a second phase pole is connected to both a second cell pole of said one solar cell unit and a first cell pole of a second of the solar cell units, and the third phase pole is connected to a second cell pole of said second solar cell unit.

2. A solar power plant according to claim 1, wherein each phase pole of the inverter unit of the direct-current converter means is connected to exactly one of the cell poles of a solar cell unit.

3. A solar power plant according to claim 1, wherein the direct-current converter means comprise:
   at least two three-phase inverter units whose direct-voltage poles are connected in parallel.

4. A solar power plant according to claim 1, comprising:
   energy storing means connected to the direct-current output poles of the direct-current converter means to store electric energy.

5. A solar power plant according to claim 1, comprising:
   network inverter means for inverting electricity fed by the direct-current converter means to the direct-current output poles into three-phase alternating current as a feed to a distribution network.

6. A solar power plant according to claim 5, wherein the network inverter means comprise:
   a three-phase inverter unit identical to the three-phase inverter unit of the direct-current converter means.

7. A solar power plant according to claim 1, wherein at least one of the solar cell units comprises:
   a plurality of solar cell elements connected in series, and/or a plurality of solar cell elements connected in parallel.

8. A solar power plant according to claim 1, comprising:
   a control unit for measuring voltage and current of each phase pole of the three-phase inverter unit of the direct-current converter means, and for controlling operation of the three-phase inverter unit using the measured voltages and currents.

9. A method for converting solar energy into an electrical direct current, the method comprising:
   converting solar energy into electric energy via a plurality of solar cell units, each solar cell unit containing a first cell pole and a second cell pole which cooperate for feeding electric energy produced by the solar cell unit as direct current from the solar cell unit, the first cell pole of a first one of the plurality of solar cell units having a same polarity as a first cell pole of a second one of the plurality of cell units;
   converting the direct currents received from the solar cell units into an output direct current having an output voltage; and
   feeding the output direct current via direct-current output poles of a direct-current converter, wherein the direct-current converter includes a three-phase inverter unit having three phase poles and two direct-voltage poles for serving as the direct-current converter such that each of the three phase poles is one of the direct-current input poles and each of the direct-voltage poles is in electrically conductive connection with exactly one of the direct-current output poles, and wherein a first phase pole of the three phase poles of the inverter unit of the direct-current converter means is connected to a first cell pole of one of the solar cell units, a second phase pole is connected to both a second cell pole of the one solar cell unit and a first cell pole of a second of the solar cell units, and the third phase pole is connected to a second cell pole of the second solar cell unit.

* * * * *